United States Patent [19]

Berzen et al.

[11] 4,110,391

[45] Aug. 29, 1978

[54] PROCESS FOR THE MANUFACTURE OF MOLDED ARTICLES FROM POLYOLEFINS WITH MOLECULAR WEIGHTS OF AT LEAST ONE MILLION

[75] Inventors: Josef Berzen, Oberhausen; Johannes Theyssen, Duisburg, both of Fed. Rep. of Germany

[73] Assignee: Ruhrchemie Aktiengesellschaft, Oberhausen, Fed. Rep. of Germany

[21] Appl. No.: 819,536

[22] Filed: Jul. 27, 1977

[30] Foreign Application Priority Data

Jul. 31, 1976 [DE] Fed. Rep. of Germany ....... 2634537

[51] Int. Cl.$^2$ ............................................. B29C 3/00
[52] U.S. Cl. ................................... 264/120; 264/126; 264/319; 264/325
[58] Field of Search ................ 264/126, 120, 85, 319, 264/325

[56] References Cited

U.S. PATENT DOCUMENTS

| | | | |
|---|---|---|---|
| 3,026,570 | 3/1962 | Beck et al. | 264/120 |
| 3,134,830 | 5/1964 | Roelen | 264/126 |
| 3,975,481 | 8/1976 | Baumgaertner | 264/126 |

*Primary Examiner*—James B. Lowe
*Attorney, Agent, or Firm*—Burgess, Dinklage & Sprung

[57] ABSTRACT

A process for the manufacture of a molded article from a powder form of a polyolefin of molecular weight of at least one million which comprises introducing a homopolymer of ethylene or a copolymer of ethylene with an α-olefin of 3 to 10 carbon atoms having a molecular weight of at least one million into a mold loosely closed with a plug, heating the same in said mold in an inert atmosphere at a temperature of 150° to 250° C, whereby said polyolefin is transformed into a rubbery elastic state, thereafter compressing said polyolefin in said mold for at least two minutes at a pressure of 2.5 to 25 N/mm$^2$ and thereafter compressing said polyolefin for at least one minute at a pressure of 40 to 100 N/mm$^2$.

13 Claims, No Drawings

PROCESS FOR THE MANUFACTURE OF MOLDED ARTICLES FROM POLYOLEFINS WITH MOLECULAR WEIGHTS OF AT LEAST ONE MILLION

BACKGROUND OF THE INVENTION

1. Field of the Invention

This invention relates to a process for the manufacture of molded articles from powder-form polymers of ethylene or copolymers of ethylene and α-olefins with 3 to 10 carbon atoms with minimum molecular weights of one million.

2. Discussion of the Prior Art

Homo- and copolymers of olefins, especially polyethylenes, with molecular weights over one million and densities between 0.92 and 0.96 g/cm$^3$ have been known for some time. Due to their specific properties, for example good sliding characteristics, low abrasion, extreme toughness and excellent resistance to solvents and corrosive chemicals, molded articles from these polymers have proven to be valuable in various industrial fields. Due to their remarkable skin compatibility and physiological neutrality, high molecular polyolefins are suitable for the manufacture of prostheses and supports as well as for implant material in bone surgery.

Olefin polymers with molecular weights over one million exhibit excellent chemical and physical properties. There are, however, considerable difficulties in their processing. In contrast to the low molecular polyolefins, the high molecular products can only be processed using molds and screw-type or Ram extruders, due to their extremely high melt viscosity. After molding and extrusion processing, a semi-finished product is obtained, from which the desired molded articles have to be produced by machining.

A process for the manufacture of solid articles from ultra-high molecular polyethylene powder is described in German Offenlegungsschrift No. 2 425 396. The powderform starting material contains particles of average size less than 100μ and a distribution function of less than 0.80. The powder is molded to a solid preform at a pressure of at least 140 kg/cm$^2$ and a temperature below the crystalline melting point. After the release of pressure, the preform is sintered at a temperature above the crystalline melting point. As the ultra-high molecular polyethylene usually contains particles above 100μ, it is necessary with this method to reduce the starting material to the required particle size by appropriate means, after the polymerization process, e.g., by grinding. An additional disadvantage of the known method lies in the fact that the molded articles are not homogeneously plasticized and during the sintering process they expand, the extent of which depends on the temperature. This expansion is due to the fact that the preform is not sintered in a mold. As a result of this, the physical properties are not consistent and vary considerably. Moreover, a high dimensional stability of the preform is not guaranteed.

OBJECT OF THE INVENTION

It is an object of the invention to eliminate the above-mentioned disadvantages of the prior art and to provide a process which, in particular, enables the molded articles to be produced by a simple method from high molecular powder-form olefin polymers, which also meet the demands for high quality.

SUMMARY OF THE INVENTION

Broadly, this invention contemplates a process for the manufacture of a molded article from a powderform of a polyolefin of molecular weight of at least one million which comprises introducing a homopolymer of ethylene or a copolymer of ethylene with an α-olefin of 3 to 10 carbon atoms having a molecular weight of at least one million into a mold loosely closed with a plug, heating the same in said mold in an inert atmosphere at a temperature of 150° to 250° C, preferably 190° to 210° C, whereby to transform said polyolefin into a rubbery elastic state, thereafter, preferably immediately thereafter, pressing said polyolefin in said mold for at least two minutes at a pressure of 2.5 to 25 N/mm$^2$ (in a first stage) and, thereafter, (in a second stage) compressing said polyolefin for at least one minute at a pressure of 40 to 100 N/mm$^2$. Thereafter, molded articles are obtained after allowing the mass to cool, pressure-free, in the mold.

The new process allows the manufacture of the most varied molded articles, for example rods, rollers and sections of any shape and other molded articles, like cog wheels.

The process according to the invention is especially suitable for the processing of high molecular, powder-form polyethylene. However, high molecular copolymers of ethylene with $C_3$ to $C_{10}$ olefins can also be processed with the same good results. These types of copolymers usually contain, besides ethylene, up to 5 percent of a higher α-olefin, of which especially propene, heptene-(1), pentene-(1), hexene-(1), 3-methylbutene-(1) and 4-methylpentene-(1) are of importance. The molecular weight of the homo- and copolymer is at least one million and is usually more than 3.5 million. Generally, these polymers have molecular weights between 1 million and 10 million.

The usual methods for the manufacture of homo- or copolymers of ethylene with a molecular weight of at least one million is carried out at low pressure. Suitable processes are, for example, the Ziegler process, in which compounds (lower oxidation states) of transition metals of the Groups 4A to 6A of the Periodic System are employed, together with organometallic compounds of the elements of Groups 1A, 2A and 3B of the Periodic System, as catalysts. According to another process (c.f. US-PS 3,051,993) high molecular polyethylene is produced from anhydrous, oxygen-free ethylene in the gas phase, in the presence of chromium oxide and alkyl metal containing supported catalysts.

The characteristic molecular weight of the starting material is calculated viscosimetrically. A description of this method is given, for example, by Elliot, Horowitz and Hoodock in the *Journal of Applied Polymer Science,* Vol. 14, 2947–2963, 1970. Of special importance is the fact that the polyolefins, according to the process of the invention, can be processed in the mold directly after being synthesized. These polyolefins generally have a grain size of about 60 to 500μ, the main portion being approximately 100μ. The bulk weights of the powder-form olefin polymer lie between 200 and 400 g/l.

Generally speaking, the compression of the respective masses in the first and second compression stages can be effected by a press hydraulic.

The new process is very simple to carry out. The powder-form olefin polymer is put into a mold, the shape of which is immaterial. The mold should have a suitable plug, which is loosely closed and thus not air tight. The plug exerts only slight pressure (less than 0.01 N/mm$^2$) on the powder. The mold is then heated in a suitable apparatus, for example in an electric oven, to a temperature of 150° to 250° C, preferably 190° to 210° C. This temperature lies above the crystalline melting point and below the decomposition temperature of the olefin polymer. The heating of the starting material must occur in the complete absence of oxygen, in order to avoid oxidative damage to the polymer. The heating is therefore carried out in an inert atmosphere, for example in the presence of nitrogen. The heating period depends on the extent of the bulk weight of the polyolefin powder. It usually requires at least 2 hours. The heating period lasts generally 2 to 6 hours in dependence of the thickness of the prepared plates. For 40 mm thick plates 6 hours are adequate. During the heating, the high molecular polyolefin, which has no melting point, is transformed into a rubbery-elastic state. By means of the weight of the loose mold plug, a slight compression of the powder bulk weight, as well as an extensive degasification of the molding materials, is achieved.

After heating, generally immediately, that means 1 to 5 minutes, the rubbery-elastic material is compressed in the mold for at least 2 minutes at pressures of 2.5 to 25 N/mm$^2$, preferably 5 to 10 N/mm$^2$. During this process, gaseous components, if still present in the polyolefin, escape and a contraction of the sintered powder-form articles occurs. It is very important that the polymer is compressed straight after the sintering process, in order that no appreciable drop in temperature occurs and therefore, the rubbery-elastic state is maintained by the hot mold. Usually, the mold has accumulated so much heat that further heating is unnecessary. Generally, this step is performed for between 2 and 4 minutes, especially about 4 minutes.

Following the first pressurized stage, the preformed articles are compressed in a second stage for at least a further minute at pressures of 40 to 100 N/mm$^2$, preferably 40 to 60 N/mm$^2$. This second stage usually follows immediately after the first stage. Generally, this second stage compression is performed for between 1 and 5 minutes, especially about one minute. The molded articles are then allowed to cool to room temperature or below. The length of time required for the cooling depends on the size of the molded articles and is at least one hour. The cooled article, which is then completely plasticized and free of shrinkage cavities, can be removed from the mold without difficulty.

The process according to the invention makes it possible to manufacture molded articles with dimensional stability from high molecular polyolefins directly, i.e., without further machining. An appreciable amount of material is therefore saved. As the pressure treatment of the molded forms requires only a short period of time, a far better utilization of the mold capacity is obtained. Apart from this, the pressure treatment of the plasticized molded articles can occur at room temperature. Besides the energy saving, it is also possible to use simple molds, i.e., which do not require heating. It is also of importance that the heating and cooling, in contrast to the usual molding, can be carried out pressure-free. The new process guarantees a high rate of production through the use of multiple molds or automatic processing. The sintering process can also take place in any form of heating apparatus which maintains the temperature between 150° and 250° C.

The process according to the invention is illustrated in more detail in the following examples. Throughout this specification and in the claims, where reference is made to molecular weight, the same is expressed in units determined viscosimetrically.

In order to achieve the characteristic physical properties of the molded articles, manufactured according to the invention, i.e., tensile strength, ultimate tensile strength and elongation at tear, the tests were carried out according to DIN standard 53 455, at 120° C. as described by Kading (Brennstoff-Chemie Vol. 49, (1968), pp. 337-341).

EXAMPLES

EXAMPLE 1

Powder-form high molecular polyethylene with a viscosimetrically determined molecular weight of 3.5 million, a bulk weight of about 400 g/l, a density of 0.94 g/cm$^3$ and the main portion of particles being approximately 100$\mu$, is processed.

200 g of this powder are put into a round mold (diameter 150 mm) weighted with a fitting mold plug and are heated for 2 hours in a nitrogen atmosphere in an electric oven at 200° C. Immediately after, the partly sintered powder grains are compressed in an unheated hydraulic press for 2 minutes at 5 N/mm$^2$ and a further 3 minutes at 40 N/mm$^2$. They are then left to cool pressure-free for an hour, after which the 10 mm thick finished product is removed from the mold at a temperature of about 70° C. The molded articles have the following physical properties:

| | | | Testing Method |
|---|---|---|---|
| Density: | | 0.937 g/cm$^3$ | DIN 53 479 |
| Ball Indentation Hardness | | 39 N/mm$^2$ | DIN 53 456 |
| Tensile Strength | at 23° C | 22 Nmm$^2$ | |
| Ultimate Tensile Strength | at 23° C | 38 N/mm$^2$ | DIN 54 455 |
| Elongation at Tear | | 450 % | |
| Tensile Strength | at 120° C | 3.7 N/mm$^2$ | |
| Ultimate Tensile Strength | at 120° C | 15.0 N/mm$^2$ | |
| Elongation at Tear | | 625 % | |

An increase of the pressure in the second stage to 100 N/mm$^2$ does not affect the above-mentioned values.

EXAMPLE 2

Powder-form high molecular polyethylene with a molecular weight of 3.5 million, a bulk weight of approximately 200 g/l and a density of 0.94 g/cm$^3$ and a grain distribution, of which the maximum diameter of the grains is approximately 100$\mu$, was compressed according to the procedure in Example 1.

|  | | | Testing Method |
|---|---|---|---|
| Density: | | 0.936 g/cm³ | DIN 53 479 |
| Ball Indentation Hardness | | 40 N/mm² | DIN 53 456 |
| Tensile Strength | } at 23° C | 25 N/mm² | |
| Ultimate Tensile Strength | | 38 N/mm² | DIN 53 455 |
| Elongation at Tear | | 322 % | |
| Tensile Strength | } at 120° C | 3.7 N/mm² | |
| Ultimate Tensile Strength | | 16.0 N/mm² | |
| Elongation at Tear | | 631 % | |

EXAMPLE 3

An especially fine, high molecular polyethylene with the main portion of grains under 100μ was compressed according to Example 1.

|  | | | Testing Method |
|---|---|---|---|
| Density | | 0.936 g/cm³ | DIN 53 479 |
| Ball Indentation Hardness | | 39 N/mm² | DIN 53 456 |
| Tensile Strength | } at 23° C | 21 N/mm² | |
| Ultimate Tensile Strength | | 49 N/mm² | DIN 53 455 |
| Elongation at Tear | | 686 % | |
| Tensile Strength | } at 120° C | 3.6 N/mm² | |
| Ultimate Tensile Strength | | 15.0 N/mm² | |
| Elongation at Tear | | 691 % | |

EXAMPLE 4

Ethylene-hexene copolymer with 0.2 weight percent hexene was compressed according to the process described in Example 1. The 14 mm thick plate had the following properties:

|  | | | Testing Method |
|---|---|---|---|
| Density | | 0.934 g/cm³ | DIN 53 479 |
| Ball Indentation Hardness | | 35 N/mm² | DIN 53 456 |
| Tensile Strength | } at 23° C | 21 N/mm² | |
| Ultimate Tensile Strength | | 46 N/mm² | DIN 53 455 |
| Elongation at Tear | | 705 % | |
| Tensile Strength | } at 120° C | 3.5 N/mm² | |
| Ultimate Tensile Strength | | 19.0 N/mm² | |
| Elongation at Tear | | 738 % | |
| Notched Impact Strength (15° pointed notch) | | 145 mJ/mm² | DIN 53 453 |

EXAMPLE 5

500 g of high molecular, polyethylene powder with the same properties as in Example 1 were put into a round mold with a diameter of 150 mm and weighted with a fitting mold plug. After being sintered for a 5 hour period in a nitrogen atmosphere, it was compressed (first pressurized stage) for 4 minutes at 5 N/mm². A further compression (second pressurized stage) took place at 40 N/mm² for one minute. Thereafter, it was cooled for one hour (pressure-free).

The 35 mm thick molded article had the folowing properties:

|  | | | Testing Method |
|---|---|---|---|
| Density | | 0.938 g/cm³ | DIN 53 479 |
| Ball Indentation Hardness | | 41 N/mm² | DIN 53 456 |
| Tensile Strength | } at 23° C | 21 N/mm² | |
| Ultimate Tensile Strength | | 38 N/mm² | DIN 53 455 |
| Elongation at Tear | | 507 % | |
| Tensile Strength | } at 120° C | 3.8 N/mm² | |
| Ultimate Tensile Strength | | 18.0 N/mm² | |
| Elongation at Tear | | 740 % | |
| Notched Impact Strength (15° pointed notch) | | 156 mJ/mm² | DIN 53 453 |

What is claimed is:

1. A process for the manufacture of a molded article from a powder form of a polyolefin of molecular weight of at least one million which comprises introducing a homopolymer of ethylene or a copolymer of ethylene with an α-olefin of 3-10 carbon atoms having a molecular weight of at least one million into a mold loosely closed with a plug, heating the same in said mold in an inert atmosphere at a temperature of 150° to 250° C whereby said polyolefin is transformed into a rubbery-elastic state, thereafter compressing said polyolefin in said mold for at least two minutes at a pressure of 2.5 to 25 N/mm² and thereafter compressing said polyolefin for at least one minute at a pressure of 40 to 100 N/mm².

2. A process according to claim 1 wherein the polyolefin is heated in the inert atmosphere at a temperature of 190° to 210° C.

3. A process according to claim 1 wherein following compressing at 40 to 100 N/mm² the molded article so prepared is cooled pressure-free in the mold.

4. A process according to claim 1 wherein a copolymer is molded containing up to 5 percent of the $C_{3-10}$ α-comonomer.

5. A process according to claim 1 wherein said polyolefin is a homopolymer of ethylene.

6. A process according to claim 1 wherein said polymer has a molecular weight of more than 3.5 million.

7. A process according to claim 1 wherein the polyolefin has a grain size of 60 to 500μ.

8. A process according to claim 1 wherein the polyolefin has bulk weight of between 200 g/l and 400 g/l.

9. A process according to claim 1 wherein the plug exerts a pressure on the powder of less than 0.01 N/mm².

10. A process according to claim 1 wherein the powder is heated in the inert atmosphere for at least 2 hours.

11. A process according to claim 10 wherein the heating is performed in the absence of oxygen.

12. A process according to claim 1 wherein after the heating the molded article is compressed at 5 to 10 N/mm² and thereafter compressing of the molded article for at least one minute is performed at 40 to 60 N/mm².

13. A process according to claim 1 wherein the compressing at 2.5 to 25 N/mm² is performed for about 4 minutes and the compressing at 40 to 100 N/mm² is performed for about one minute.

* * * * *

UNITED STATES PATENT AND TRADEMARK OFFICE
CERTIFICATE OF CORRECTION

PATENT NO. : 4,110,391
DATED : August 29, 1978
INVENTOR(S) : BERZEN et al.

It is certified that error appears in the above–identified patent and that said Letters Patent are hereby corrected as shown below:

Column 4, line 24, "Kading" should read -- Käding --.

Column 7, line 7, "α-comonomer" should read -- α-olefin comonomer --.

Signed and Sealed this

Tenth Day of April 1979

[SEAL]

Attest:

RUTH C. MASON
*Attesting Officer*

DONALD W. BANNER
*Commissioner of Patents and Trademarks*